United States Patent
Hjelm

(10) Patent No.: US 6,715,372 B2
(45) Date of Patent: Apr. 6, 2004

(54) METHOD AND DEVICE FOR TESTING MACHINE TOOL

(75) Inventor: Sven Hjelm, Sodertalje (SE)

(73) Assignee: Scania CV AB (publ) (SE)

( * ) Notice: Subject to any disclaimer, the term of this patent is extended or adjusted under 35 U.S.C. 154(b) by 0 days.

(21) Appl. No.: 10/169,299

(22) PCT Filed: Dec. 19, 2000

(86) PCT No.: PCT/SE00/02578

§ 371 (c)(1),
(2), (4) Date: Jun. 27, 2002

(87) PCT Pub. No.: WO01/50083

PCT Pub. Date: Jul. 12, 2001

(65) Prior Publication Data

US 2002/0189379 A1 Dec. 19, 2002

(30) Foreign Application Priority Data

Dec. 29, 1999 (SE) .............................................. 9904837

(51) Int. Cl.⁷ ............................................. G01N 19/00
(52) U.S. Cl. ..................................................... 73/865.9
(58) Field of Search ............................. 73/865.9, 865.3

(56) References Cited

U.S. PATENT DOCUMENTS

| | | | |
|---|---|---|---|
| 4,378,660 A | * 4/1983 | Wiener | ........................ 451/47 |
| 5,111,590 A | 5/1992 | Park | .......................... 33/502 |
| 5,681,981 A | * 10/1997 | McMurtry | .................. 73/1.73 |
| 5,767,380 A | 6/1998 | Haas | .......................... 73/1.79 |
| 5,791,843 A | 8/1998 | Dreier | ........................ 409/218 |

FOREIGN PATENT DOCUMENTS

WO 9718436 5/1997

OTHER PUBLICATIONS

"Test Code for Machine Tools, Part 4: Circular Test For Numerically Controlled Machine Tools". ISO 230–4:1996(E).

Kakino, et al. "Measuring Device" pp. 17–19 of *Accurancy Inspection Of NC Machine Tools By Double Ball Bar Method* edited by Dr. Johannes Heidenhain Gmbh, 1993.

* cited by examiner

Primary Examiner—Hezron Williams
Assistant Examiner—Rodney Frank
(74) Attorney, Agent, or Firm—Ostrolenk, Faber, Gerb & Soffen, LLP

(57) ABSTRACT

On a machine tool in which a first element intended to support a machining tool, and a second element intended to support a workpiece, are mutually movable, a special test arrangement may be placed between the first element and the second element. During a mutual displacement between the first and second elements, this test arrangement can apply a predetermined force between these elements while at the same time making it possible to record the resulting shift between them. The measured results may be used for analysis of the machine's condition.

13 Claims, 2 Drawing Sheets

METHOD AND DEVICE FOR TESTING MACHINE TOOL

TECHNICAL FIELD

The present invention relates partly to a method and apparatus for testing a machine tool.

STATE OF THE ART

In many contexts, industry uses various types of machine tools for processing and manufacturing various parts. This involves needing to be able to monitor the status of such machines in order, for example, to be able to do repairs and adjustments in time to avoid stoppages or bad precision of parts being manufactured. The objective is to be able to detect changes quickly and be able to rectify them before major and expensive defects develop.

A conventional method for testing a machine is to make representative parts and then check their dimensions in order to assess the machine's performance. Disadvantages observed in this respect include the need to use tools and testpieces and difficulty in comparing results from different tests. Using standardised testpieces certainly facilitates comparisons but still requires testpieces and tools.

Another method is to monitor the machine's rigidity in different directions by applying a suitable force by means of a hydraulic cylinder and measuring the resulting deflection by means, for example, of a micrometer. A disadvantage of this method is that it is time-consuming and measurement cannot be done with the machine in operation.

Another known practice is to use a special instrument, a so-called "ball bar", fitted between workpiece holders and tool holders, to test the machine's ability to perform a circular movement. Measuring equipment in the instrument is used to record any deviations from a circle. Various such tests can be carried out at different times and compared to provide information on various characteristics of the machine, such as circularity, servo response, rectilinearity, play etc. Tests can also be done at various feed rates, in various feed directions and using bars of various lengths, and placing the workpiece holder at various different points.

There nevertheless remains the disadvantage of it not being easy to gain a proper assessment of the machine's characteristics under load.

OBJECTS OF THE INVENTION

The object of the invention is to make better machine testing possible. A further object is to achieve this by simple means.

DESCRIPTION OF THE INVENTION

The object of the invention is achieved by a method and an apparatus of the invention. On a machine tool in which a first element intended to support a machining tool, and a second element intended to support a workpiece, are mutually moveable, a special test arrangement may be placed between the first element and the second element. During a mutual displacement between the first and second elements, this test arrangement can apply a predetermined force between these elements while at the same time making it possible to record the resulting shift between them. The measured results may be used for analysis of the machine's condition.

Applying a predetermined force between the first and second elements during mutual displacement between them, and simultaneously measuring the resulting deformation, makes it possible to carry out machine testing in much more production-like conditions than was previously possible. Analysis can be further refined by also varying the manner in which the displacement takes place, as regards both movement configuration and direction of movement, and also by varying the magnitude of the force applied.

Further features and advantages of the invention are described in more detail with reference to embodiments depicted in the attached drawings.

Description of a preferred embodiment

Figure 1:
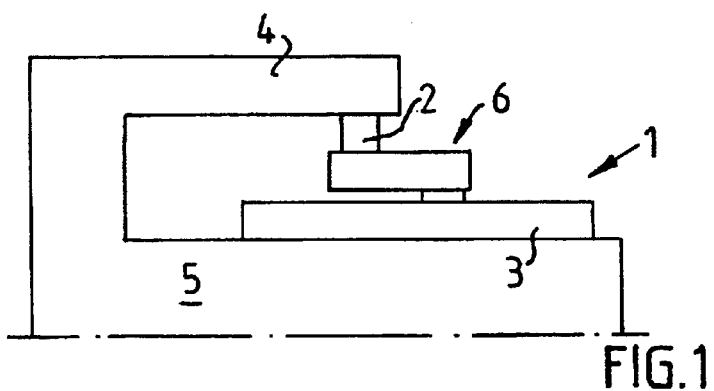
FIG. 1 is a schematic view of a machine tool with an arrangement according to the invention.

FIG. 1 depicts a machine tool 1 intended for the machining of workpieces by means of a tool fitted in the machine. This machine incorporates a first element 2 in the form of a spindle, and a second element 3 in the form of a worktable, which are movable relative to one another in a conventional manner in various directions for machining of a workpiece (not depicted) which is intended to be secured to the worktable and be machined by a tool inserted in the spindle. The first element 2 is supported by a spindle head 4 which is itself supported by a frame 5 which also supports the second element 3. To test how the machine 1 behaves during mutual displacement of the first element 2 and the second element 3, a test arrangement 6 described below and designed according to the invention is clamped between the first element 2 and the second element 3.

Figure 2:
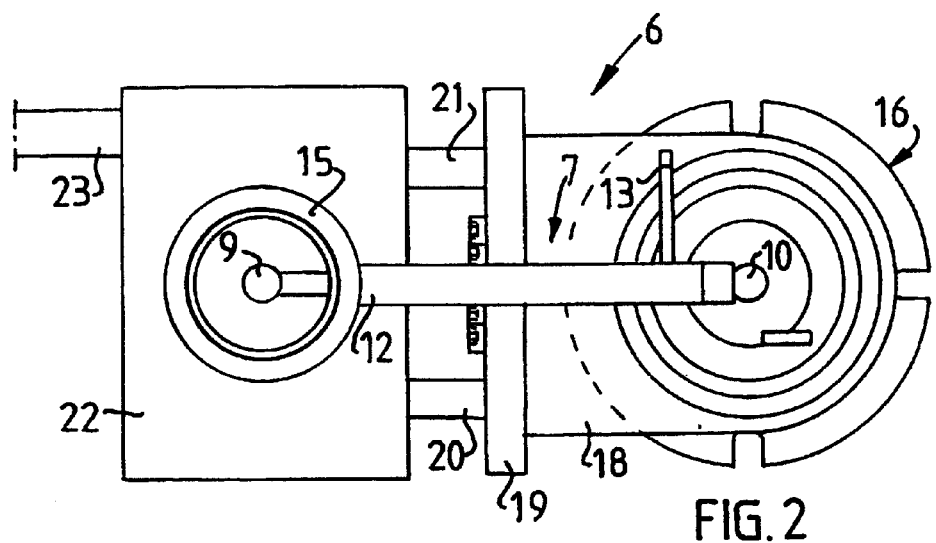
FIG. 2 is a view from above of an arrangement according to the invention.
Figure 3:
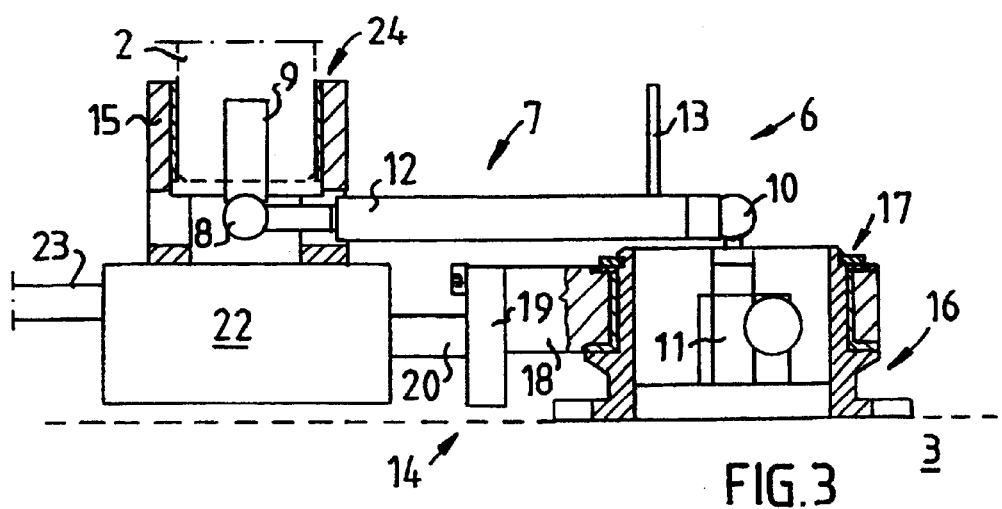
FIG. 3 is a side view, partly in section, of the arrangement in FIG. 2, FIGS. 4 and 5 show deflection in various directions between machine elements at various loads.

According to FIGS. 2 and 3, the test arrangement 6 incorporates a conventional measuring arm 7 of the "ball bar" type, which has one of its ends linked by an articulation 8 to a bracket 9 intended to be secured in the first element 2 of the machine 1, and has its other end linked via an articulation 10 to a bracket 11 intended to be fixed relative to the second element 3. A telescopic element 12 links the two articulations 8 and 10 and is provided internally with measuring equipment (not depicted) for recording changes in the distance between the articulations 8 and 10. The measuring arm 7 and its measuring equipment can be connected by an electrical line 13 to suitable external equipment 30 for recording and analysis of measurement results. In particular, the actual measured mutual relative paths of the first and second elements are compared in the equipment 30 with an intended relative movement path to provide an indication of the machine's condition.

The test arrangement 6 also incorporates a power unit 14 which, like the measuring arm 7, is intended to be fixed between the first element 2 and the second element 3. For this purpose there is not only a bracket 15 for fixing to the first element 2 but also a bracket 16 for fixing to the second element 3. Via a bearing 17 the bracket 16 supports a pivotingly mounted arm 18 which has its free end connected to a yoke 19 in which piston rods 20, 21 to two working cylinders arranged in a cylinder housing 22 are fastened. The cylinder housing 22 is provided with working medium via a line 23 and is fixed to the holder 15 which is intended to be pivotable about the first element 2 via a bearing 24.

The power unit 14 includes at least one working cylinder that can be used to apply a force substantially parallel with the measuring arm and in either opposite direction, parting or drawing together the two brackets 15 and 16, and hence also the first element 2 and the second element 3, when the test arrangement 6 is fitted for use according to FIG. 1. The measuring arm 7 can at the same time be used to ascertain the magnitude of the resulting displacements between the elements 2 and 3.

Figure 4:
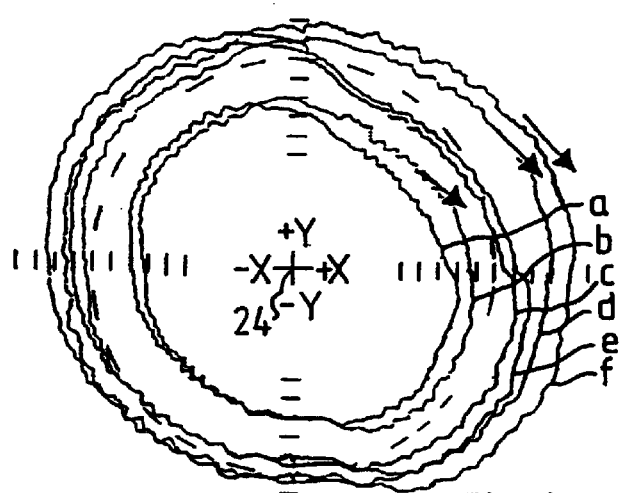

The results of a test series are depicted schematically in FIG. 4, in which the machine 1 was programmed to cause the second element 3 to perform a circular movement about the first element 2 during simultaneous application of force between the elements 2 and 3. in this diagram, a coordinate system with X and Y axes has been placed with its centre 24 in the first element 2, and curves a–f show the magnitude of the deflection in various positions resulting from various amounts of force. In the case of curves b, d and f, provided with arrows, the movement, viewed from above in FIG. 1, was in a clockwise direction, while that depicted by the other curves (a, c and e) was in an anticlockwise direction. The force applied was 330N on curves a and b, 660N on curves c and d and 825N on curves e and f. The feed rate, i.e. the circumferential speed of the second element 3 with respect to the first element 2, was 1000 mm/mm in all cases. As may be seen, the amount of displacement increases with the amount of force applied but differently in different directions of movement.

Figure 5:
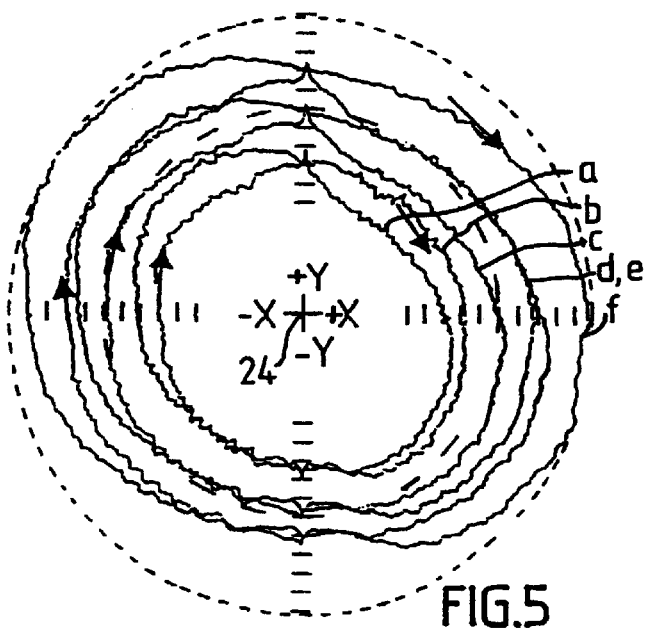

FIG. 5 shows schematically the results of a test series in somewhat different conditions from the test series in FIG. 4. In this case the feed rate was increased to 5000 mm/min. The force applied for curves a–d was the same as in FIG. 4 but was increased to 990N for curves e and f. Here again the amount of deflection increases with the amount of force applied and differs in different directions, but not in the same way as in FIG. 4.

The diagrams in FIGS. 4 and 5 may be said to constitute the machine's "fingerprint" in various situations and provide, inter alia, information on how its rigidity varies in different directions at different amounts of load. They also provide a picture of the precision with which the machine can perform a certain type of movement under given conditions.

Figure 6:
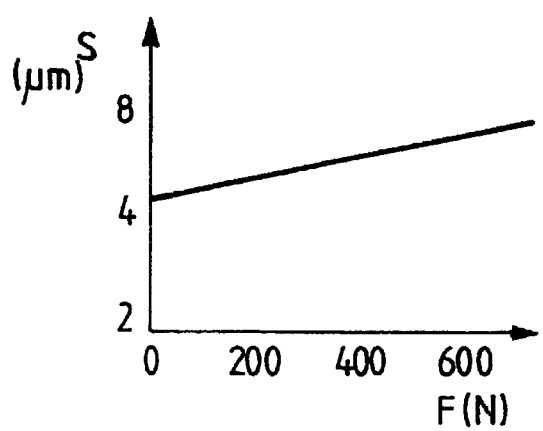
FIG. 6 is a load diagram.

Another type of test result is depicted in FIG. 6, where the change in rectilinearity S, measured in micrometers, is shown as a function of the magnitude of the force applied F, indicated in N (newtons). It shows that the change is linear.

It is obvious that further types of tests may provide further types of information about the machine. It is possible, for example, in a specified mutual position between the first element 2 and the second element 3, to carry out measurements both with force increase and with force decrease in order to gain an assessment of hysteresis in the measuring system. This makes it possible to find out how to compensate internal friction and elasticity in the measuring system with a view to immediately produce reliable measuring results.

For precision reasons, the bearings 17 and 24 used must have good accuracy, i.e. minimum play, and, at the same time, low friction. Sliding or rolling bearings, e.g. needle bearings, may be suitable for the purpose but magnetic or hydrostatic bearings are also attractive, although expensive.

The movements described above were in a substantially horizontal plane but there is of course nothing to prevent analysis of movements in a plane with a different orientation, e.g. vertical. An improved version of the conventionally made articulations 8 and 10, with a view to enabling them to absorb sufficiently large forces, may make it possible to integrate the power unit 14 with the telescopic element 12. It is also possible at the same time to make the articulations 8 and 10 movable in three dimensions in order to be able to carry out testing in any desired direction. An integrated version makes for easier fitting and removal.

Signal transmission from the measuring arm 7 is here depicted via an electrical line 13 but other versions are of course conceivable, e.g. using some kind of wireless transmission to avoid problems with electrical lines during rotary movements.

In the case of the machine tool depicted in FIG. 1, the first element 2 is fixed while the second element 3 is movable in a plane perpendicular to the plane of the drawing. There is of course nothing to prevent the second element 3 being fixed instead while the first element 2 may be movable. A combination of such movements is also possible, depending on what is necessary and desirable in the particular case.

The power unit 14 described above may within the scope of the invention also take a number of different forms, e.g. it is possible for the arm 18 to take the form of a cylinder housing instead. It is also possible for a single cylinder to be used instead of two, etc.

As previously indicated, the two brackets 15 and 16 are to make it possible to use the power unit 14 to load the first element 2 and the second element 3, so said brackets have within the scope of the invention to be adapted as appropriate to the particular type of machine.

Diagrams of the type depicted in FIGS. 4–6 may be used for calculating a large number of different parameters which characterise the machine's behaviour under load. Precision in circular movement can be read off, but precision in linear movements and various types of composite movement can also be calculated. The amount of force dependency provides a good measure of the machine's quality in that little force dependency indicates good quality and good precision, whereas great force dependency indicates less good quality and inferior precision.

In addition, the measured values arising from testing a certain machine tool according to the invention may be used for imposing corrections to rectify deflection in various load situations in the control programme for the machine concerned. The machine's accuracy might thus be substantially improved. The economic gains might become significant if relatively inexpensive machines could therefore be used instead of more expensive high-precision machines. Said measured values obtained may also be used in digital simulation of the actual machining process to provide a more realistic picture of that process.

What is claimed is:

1. A method for testing a machine tool, wherein the machine tool includes a first element for supporting a machining tool, a second separate element for supporting a workpiece and the first and second elements are relatively moveable to various settable patterns of movement; a measuring arm between the first and second elements and measuring the relative patterns of movement;

the method comprising:
displacing the first and second elements mutually in an intended mutual circular movement path, and applying a predetermined force between the first and second elements and substantially in the longitudinal direction of the measuring arm in various mutual positions between the first and second elements;

recording the actual movement path by the measuring arm;

comparing the intended movement path with the actual movement path for determining the machine condition.

2. The method of claim 1, further comprising continuously applying the predetermined force during the mutual displacement between the first and second elements.

3. The method of claim 2, wherein the magnitude of the predetermined force is periodically altered and the actual relative movement between the first and second elements is thereafter repeated with recording of the movement paths and subsequent comparison with the intended movement path.

4. The method of claim 1, wherein the intended mutual circular movement path includes circular movements, and a plurality of the circular movements are performed in opposite rotational directions.

5. The method of claim 4, wherein the circular movements are performed at different radii.

6. The method of claim 1, wherein the intended mutual circular movement path includes circular movements and the circular movements are performed at different radii.

7. The method of claim 6, wherein the intended mutual circular movement paths comprise similar patterns of movement performed at different machine feed rates.

8. The method of claim 1, wherein the intended mutual circular movement paths comprise similar patterns of movement performed at different machine feed rates.

9. The method of claim 8, wherein the patterns of movement are performed with a feed rate which is normal for the machine.

10. The method of claim 1, wherein the intended mutual circular movement path comprises a plurality of the intended paths and the movement paths in one plane.

11. The method of claim 1, wherein the intended mutual circular movement path comprises a plurality of the intended paths and the actual movement paths are performed in three dimensions.

12. The method of claim 1, wherein the actual movement paths are performed in three dimensions.

13. The method of claim 1, wherein the magnitude of the predetermined force is periodically altered and the actual relative movement between the first and second elements is thereafter repeated with recording of the movement paths and subsequent comparison with the intended movement path.

* * * * *